June 11, 1929.　　　J. B. JOHNSON　　　1,717,157

CONTROL FOR DRAFT DAMPERS

Filed Nov. 28, 1928

Joseph B. Johnson, INVENTOR

BY Loyal J. Miller, ATTORNEY

Patented June 11, 1929.

1,717,157

UNITED STATES PATENT OFFICE.

JOSEPH B. JOHNSON, OF ALFALFA, OKLAHOMA.

CONTROL FOR DRAFT DAMPERS.

Application filed November 28, 1928. Serial No. 322,445.

My invention relates to improvement in control for draft dampers.

The object of my invention is to provide a device of the class described which will be new, novel, efficient and of utility; which will provide means for holding the damper or valve securely at any one of a plurality of positions desired; that will not be affected by the heat thereby untempering the holding means for the valve and valve shaft; that will be applicable in approximately all kinds of places wherein a draft control is desired for use; that will be easily and cheaply manufactured; easily and cheaply installed; which can be adjusted so as to take up any slack occurring in the holding of the parts in their respective intended positions; which will allow the adjusting of the valve or damper in any desired position and holding it in such position until a change in the position is desired.

In most of the dampers or valves now used in connection with pipe drafts the holding means is rigidly attached to a pipe and the spring used as a holding means is subjected to great heat and thereby becomes untempered and loses its effectiveness and the damper is therefore not controllable or holdable thereby and the draft cannot thereafter be controlled by such valve or damper. My invention obviates the objections as stated.

Figure 1:
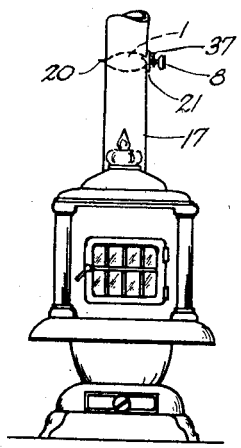
Figure 2:
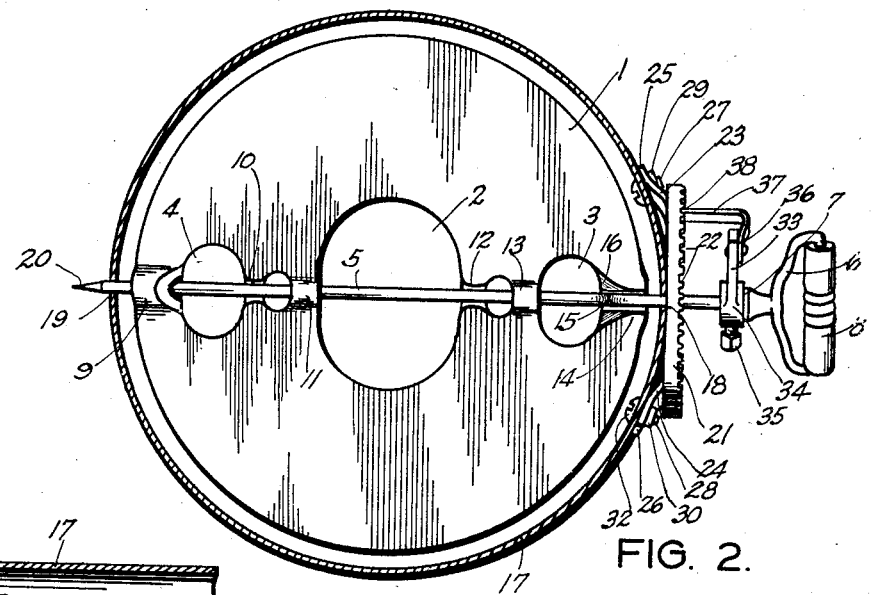
Figure 3:
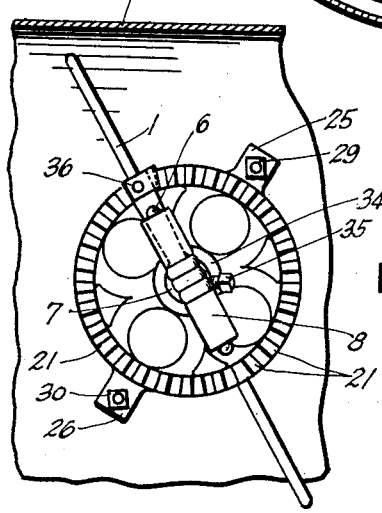

With these and other objects in view as will more fully appear my invention consists in the construction, novel features, and combination of parts hereinafter more fully described, pointed out in the claims hereto appended and illustrated in the accompanying one-sheet drawing, of which, Figure 1 is an elevational view of a heating-stove with the control for draft damper installed; Fig. 2 is a plan view of the damper showing the pipe in section; Fig. 3 is an elevational view of the damper control showing a fragment of the pipe.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is understood that the drawings are to be interpreted as being illustrative and not restrictive.

One embodiment of my invention is shown as follows: My device may be used with the ordinary and usual valve or damper for a pipe, and the like, or it may be used with a special one, if desired. The damper used is such as is shown at 1 being best shown in Fig. 2, and has a central opening 2 and two smaller openings 3 and 4. A damper shaft 5 is provided having a handle holding member 6 with a shoulder 7 thereon and a handle portion 8 of wood or other suitable material. Said damper has a plurality of oppositely bent portions 9, 10, 11, 12, 13 and 14 adapted for holding said damper shaft 5. These bent portions with a bend 15 in said shaft 5 and bend 16 in said damper serve to hold said shaft 5 and damper 1 in rigid connection with each other for turning said damper within the pipe. Said shaft is inserted in the pipe 17 at perforation 18 and through its opposite side perforation 19 wherein it has its bearing adjacent its point 20. I provide a serrated disc member 21 having upstanding serrations 22 thereon. It is adapted for seating around said shaft 5 on the outside of pipe 17 adjacent where said shaft 5 fits in perforation 18. It is provided with legs 23 and 24, being fastened to said disc 21 and having feet 25 and 26, for seating on said pipe 17, being fastened thereon by screw-bolts 27 and 28 and nuts 29 and 30. I prefer to have the round smooth heads 31 and 32 of said screw-bolts 27 and 28. placed inside the pipe so as to decrease the likelihood of the edges of the valve coming in contact therewith. I also prefer to have said arms and feet placed on said pipe at an angle of approximately 45° rather than parallel with its longitudinal dimension, or with its horizontal cross-section dimension, for better allowance of clearance of the edge of said damper 1 past said screw-bolt heads 31 and 32. I also provide an arm 33 having a head 34 adapted for fastening on said shaft 5 adjacent said shoulder 7. A set-screw 35 holds said head 34 securely to said shaft 5. Said arm 33 is provided at its outer end for fastening by suitable holding means the upper end 36 of a leaf spring 37. The lower end 38 of said leaf spring 37 being adapted for meshing with the serrations 22 of said disc 21. Said leaf spring 37 is to be of such stiffness and tautness as to permit its moving on said serrated teeth 22 upon the turning of handle 8 and shaft 5, and yet to hold said serrated disc 21, said shaft 5 and said damper

1 securely in such position as is desired for providing the amount of draft wanted in said pipe 17.

It will be observed by those familiar with the art to which my invention pertains that in order to open the damper from a closed position to an open position it will only require a quarter turn of my device, and any point intermediate a fully closed and fully opened position may be easily obtained by gauging the leaf spring relatively therebetween. It is also noted that said device may be arranged for moving both forward and backward; or that it can be arranged to continue the movement in a forward turning position gauging it.

Having thus described my invention what is claimed and desired to be secured by Letters Patent is:

1. A device, as described, for controlling a draft damper in a pipe, comprising a damper shaft for turning said damper, having a handle thereon, a disc having serrations on its outer side, and adapted for suitably fastening to the outside of said pipe and to encircle said shaft, means for fastening said disc and said pipe together, an arm, means for adjustably positioning said arm on said shaft, and a leaf spring disposed on said arm co-acting therewith, and meshing with said serrations for holding said damper as desired.

2. The combination with a damper, pipe, damper shaft and handle, of a device, as described, comprising a serrated disc fastened to said pipe and surrounding said shaft, a lateral arm and means fastening same to said shaft, and leaf spring means suitably fastened to said arm and meshing with said serrations for holding said damper as desired.

3. The combination with a draft damper, pipe, damper shaft and handle, of a serrated disc member being rigidly mounted on said pipe and surrounding said shaft, an arm adjustably mounted on said shaft, a leaf spring mounted on said arm and being adapted to mesh with serrations on said disc and adapted for holding said damper in various positions.

4. The combination with a damper and pipe, and with a damper shaft and handle, of a device of the class described, comprising a serrated disc adapted for fastening outside said pipe, screw-bolts and nuts adapted for suitably holding said disc to said pipe, an arm, a collar and set-screw for adjustably positioning said arm on said shaft adjacent said handle, and a leaf spring adapted to co-act with said arm and meshing with the serrations on said disc for holding said damper as desired.

JOSEPH B. JOHNSON.